(12) United States Patent
Yoshikawa

(10) Patent No.: US 8,223,292 B2
(45) Date of Patent: Jul. 17, 2012

(54) LIGHTING DEVICE FOR USE WITH DISPLAY APPARATUS AND DISPLAY APPARATUS

(75) Inventor: Takahiro Yoshikawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 284 days.

(21) Appl. No.: 12/596,651

(22) PCT Filed: Jan. 15, 2008

(86) PCT No.: PCT/JP2008/050326
§ 371 (c)(1),
(2), (4) Date: Oct. 19, 2009

(87) PCT Pub. No.: WO2008/142872
PCT Pub. Date: Nov. 27, 2008

(65) Prior Publication Data
US 2010/0134714 A1    Jun. 3, 2010

(30) Foreign Application Priority Data
May 17, 2007    (JP) .................................. 2007-131884

(51) Int. Cl.
*G02F 1/133* (2006.01)
(52) U.S. Cl. ........................................... 349/58; 349/60
(58) Field of Classification Search .................. None
See application file for complete search history.

(56) References Cited

U.S. PATENT DOCUMENTS

| | | | |
|---|---|---|---|
| 7,607,805 B2 * | 10/2009 | Kwon et al. | 362/378 |
| 7,926,965 B2 * | 4/2011 | Cho et al. | 362/97.1 |
| 2002/0186333 A1 | 12/2002 | Ha et al. | |
| 2005/0151041 A1 * | 7/2005 | Tatsukami et al. | 248/220.21 |
| 2005/0226002 A1 * | 10/2005 | Aoki et al. | 362/581 |
| 2006/0279957 A1 * | 12/2006 | Kwon et al. | 362/378 |
| 2007/0217223 A1 | 9/2007 | Ha et al. | |
| 2007/0286629 A1 * | 12/2007 | Kwon et al. | 399/69 |
| 2007/0298662 A1 * | 12/2007 | Kim | 439/620.02 |
| 2008/0079862 A1 | 4/2008 | Lee | |
| 2008/0113540 A1 | 5/2008 | Miyazono | |

FOREIGN PATENT DOCUMENTS

| | | |
|---|---|---|
| CN | 1384387 A | 12/2002 |
| JP | 10-91098 A | 4/1998 |
| JP | 2002-341348 A | 11/2002 |
| JP | 2007-48715 A | 2/2007 |
| JP | 2008-27880 A | 2/2008 |

* cited by examiner

*Primary Examiner* — Mike Stahl
(74) *Attorney, Agent, or Firm* — Birch, Stewart, Kolasch & Birch, LLP

(57) ABSTRACT

A lighting device 12 in accordance with the present invention is for use with a display apparatus. The lighting device 12 includes a light source 17, a plate shaped chassis 14 that covers the light source 17, and an inverter board 30 attached to the chassis 14. The lighting device 12 is characterized in that, accompanying slide of the inverter board 30 in a direction parallel to the chassis, the inverter board 30 is attached and detached.

14 Claims, 21 Drawing Sheets

LIGHTING DEVICE FOR USE WITH DISPLAY APPARATUS AND DISPLAY APPARATUS

TECHNICAL FIELD

The present invention relates to a lighting device for use with a display apparatus and a display apparatus using the same.

BACKGROUND ART

A display apparatus using nonluminous optical elements represented by a liquid crystal display apparatus is provided with a backlight device on the back face of a display panel such as a liquid crystal panel so as to emit light toward the display panel. The backlight device is configured with a light source such as a fluorescent lamp, a chassis that accommodates the light source and opens on the liquid crystal panel side, an optical sheet disposed in the opening of the chassis, and an inverter board whereon a lighting circuit for lighting the light source is mounted. The inverter board is disposed on a face of the chassis, the face being on a side opposite from the light source.

The configuration to attach the inverter board to the chassis is as follows: the chassis face on the side opposite from the light source is provided with a base portion partially protruding from the face, and the inverter board is placed on the base portion. The base portion and the inverter board are pierced by respective screw holes in the superposed portions, and they are screwed up with a screw so that the inverter board is held between the screw and the base portion.

Furthermore, the lighting circuit provided on the inverter board and the light source are connected together via harnesses so that electrical power is supplied to the light source.

Furthermore, there is a case where an inverter cover is provided so as to cover the inverter board. In this case, similar to the above-explained configuration to attach the inverter board, the inverter cover is screwed up to the chassis with a screw. Furthermore, there is also a case where another board such as a video control board or an input/output board are disposed on the chassis in a manner layered over the inverter board.

Incidentally, in a case of detaching the above-explained inverter board from the chassis for maintenance checkup or repair, first, the inverter cover or another substrate screwed up to the chassis has to be removed, next, all harnesses connected to the inverter board have to be pulled away, and, further, the screw that secures the inverter board to the chassis has to be taken away. These operations are extremely troublesome and take effort.

Accordingly, as a method for clearing away the troublesomeness of the above-explained operations, a method for connecting the light source and the inverter board without via any harness has been developed (see the following Patent Document 1).

[Patent Document 1] Unexamined Japanese Patent Application Publication No. 2007-48715

Problem to be Solved by the Invention

The Patent Document 1 discloses a liquid crystal display apparatus wherein an electric connector has a contact connected to a fluorescent lamp on a first face of a circuit board, while the contact includes a lead extending along a second face of the circuit board and connected to the inverter board.

With this configuration, the light source and the inverter board can be connected together without using any harness.

However, even with the above-explained configuration, in the case of detaching the inverter board, such operations as detaching the screwed inverter cover or another substrate and, further, taking out the screw that secures the inverter board to the chassis is necessary. These operations still take effort.

DISCLOSURE OF THE INVENTION

The present invention has been completed on a basis of the circumstances as explained above, and its purpose is to provide a lighting device for use with a display apparatus, the lighting device including a configuration capable of detaching an inverter board without being accompanied with any troublesome operation. Furthermore, a purpose of the present invention is to provide a display apparatus using the lighting device for use with the display apparatus and is superior in maintenance performance.

Means for Solving the Problem

In order to solve the above problem, the lighting device for use with the display apparatus in accordance with the present invention includes: a light source; a flat plate shaped chassis that covers the light source; and an inverter board attached to the chassis. The lighting device is characterized in that, accompanying slide of the inverter board in a direction parallel to chassis, the inverter board is detached from and attached to the chassis.

With this configuration, the inverter board can be detached from and attached to the chassis only by the operation to slide the inverter board along the chassis. That is, in a case where detachment of the inverter board is desired, it is unnecessary to operate any conventional operation to detach a screw securing the inverter board itself, and the inverter board can be detached only with force applied parallel to the flat-plate shaped chassis to the inverter board. This simplifies the operation to detach the inverter board.

Note that, as a means for securing the inverter board to the chassis, various kinds of suitable means such as engagement by an engaging portion (an engaged portion) annexed to the inverter board with an engaged portion (an engaging portion) annexed to the chassis, fitting of the inverter board to a groove portion constructed on the chassis, etc. can be selected.

EXPLANATION OF REFERENCE CHARACTERS

Best Mode for Carrying Out the Invention

An embodiment in accordance with the present invention will be explained with reference to FIGS. 1 through 5.

Figure 1:
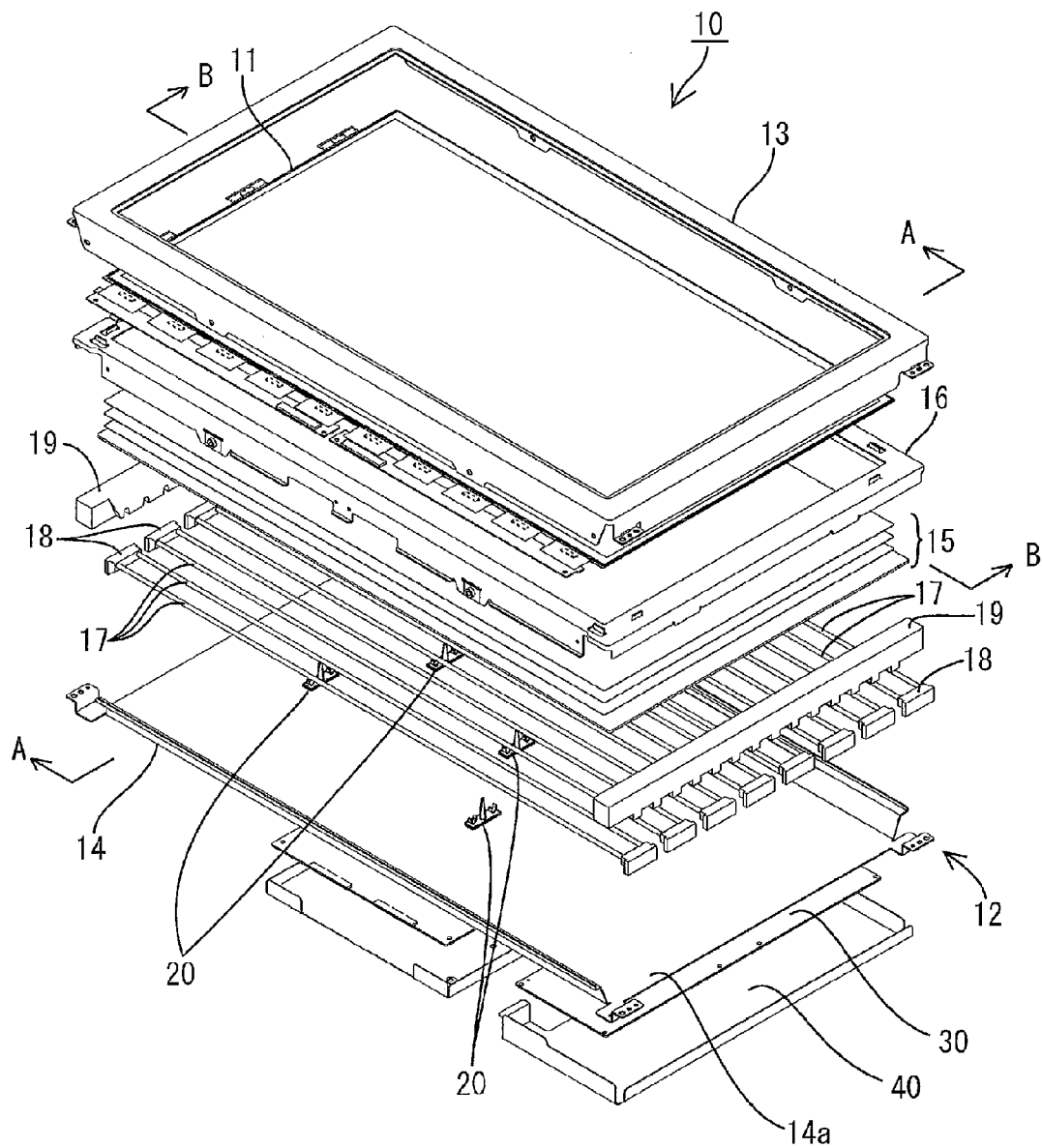
FIG. 1 is an exploded perspective view illustrating a schematic configuration of a liquid crystal display apparatus of an embodiment in accordance with the present invention.
Figure 2:
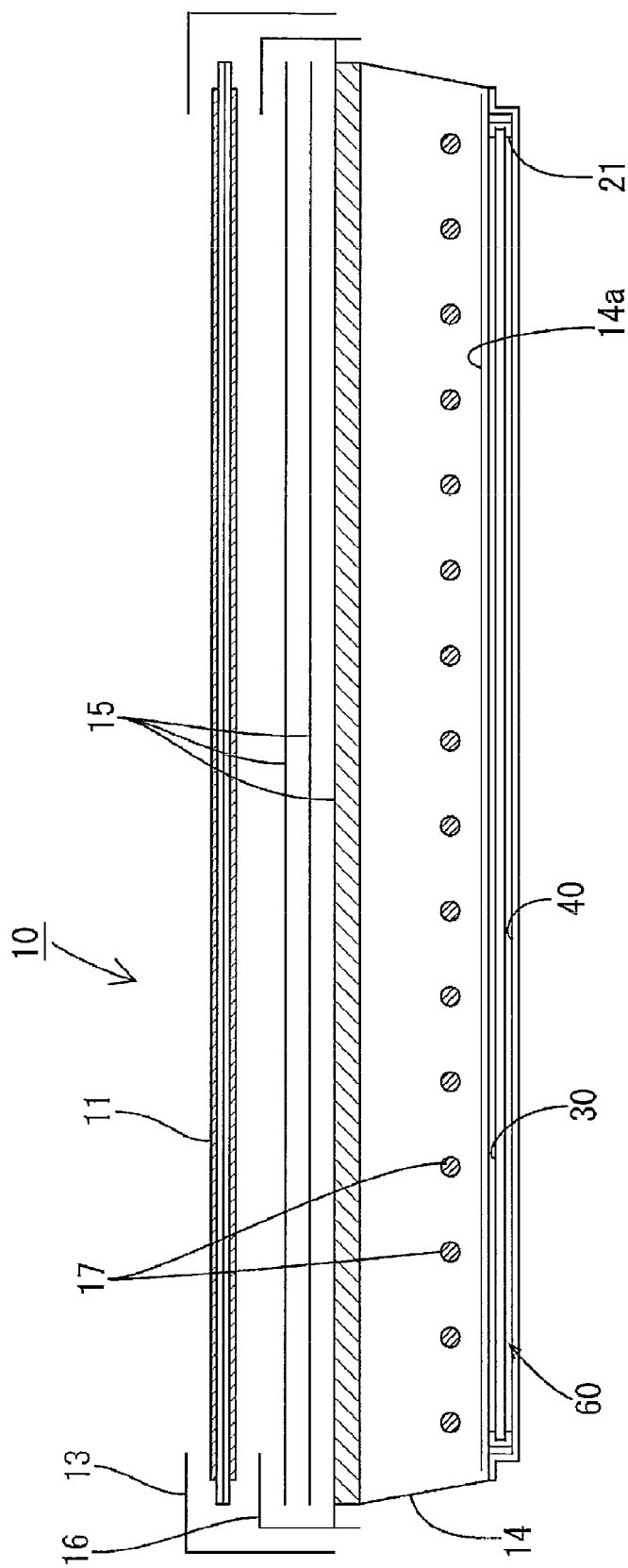
FIG. 2 is a sectional view of the liquid crystal apparatus along the line A-A in FIG. 1.
Figure 3:
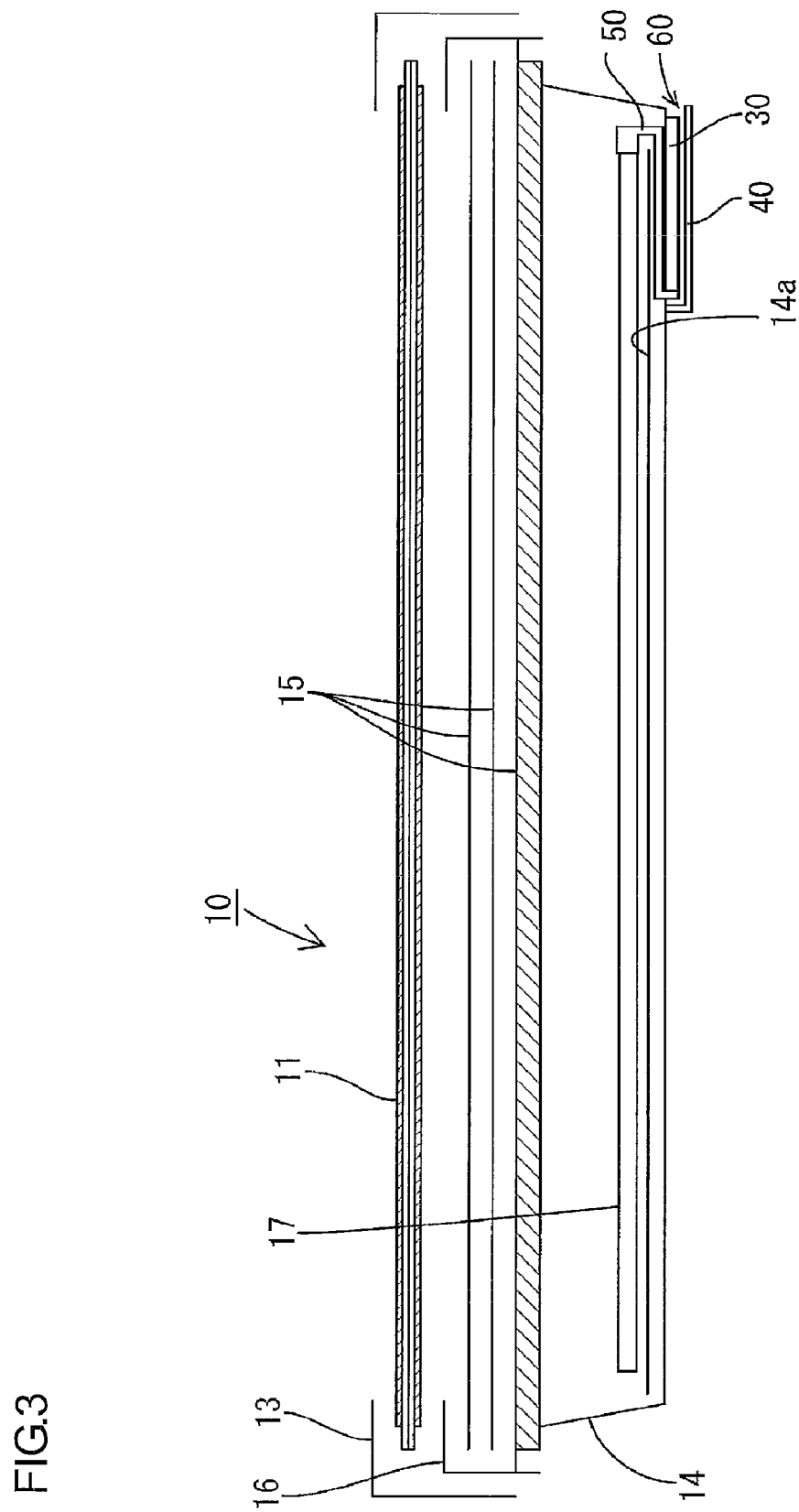
FIG. 3 is a sectional view of the liquid crystal apparatus along the line B-B in FIG. 1.
Figure 4:
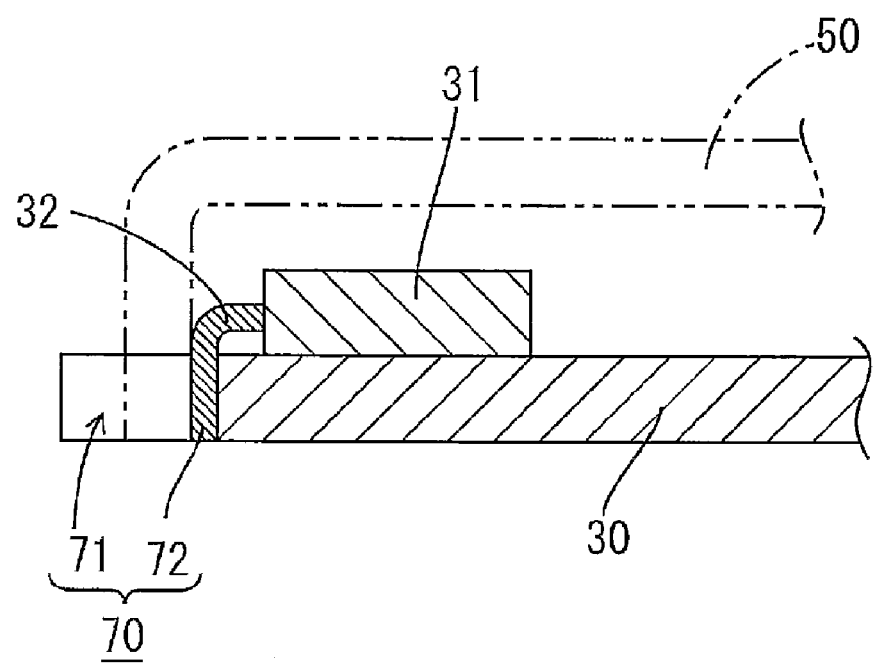
FIG. 4 is a sectional view illustrating a schematic configuration of an inverter board that the liquid crystal apparatus of FIG. 1 includes.
Figure 5:
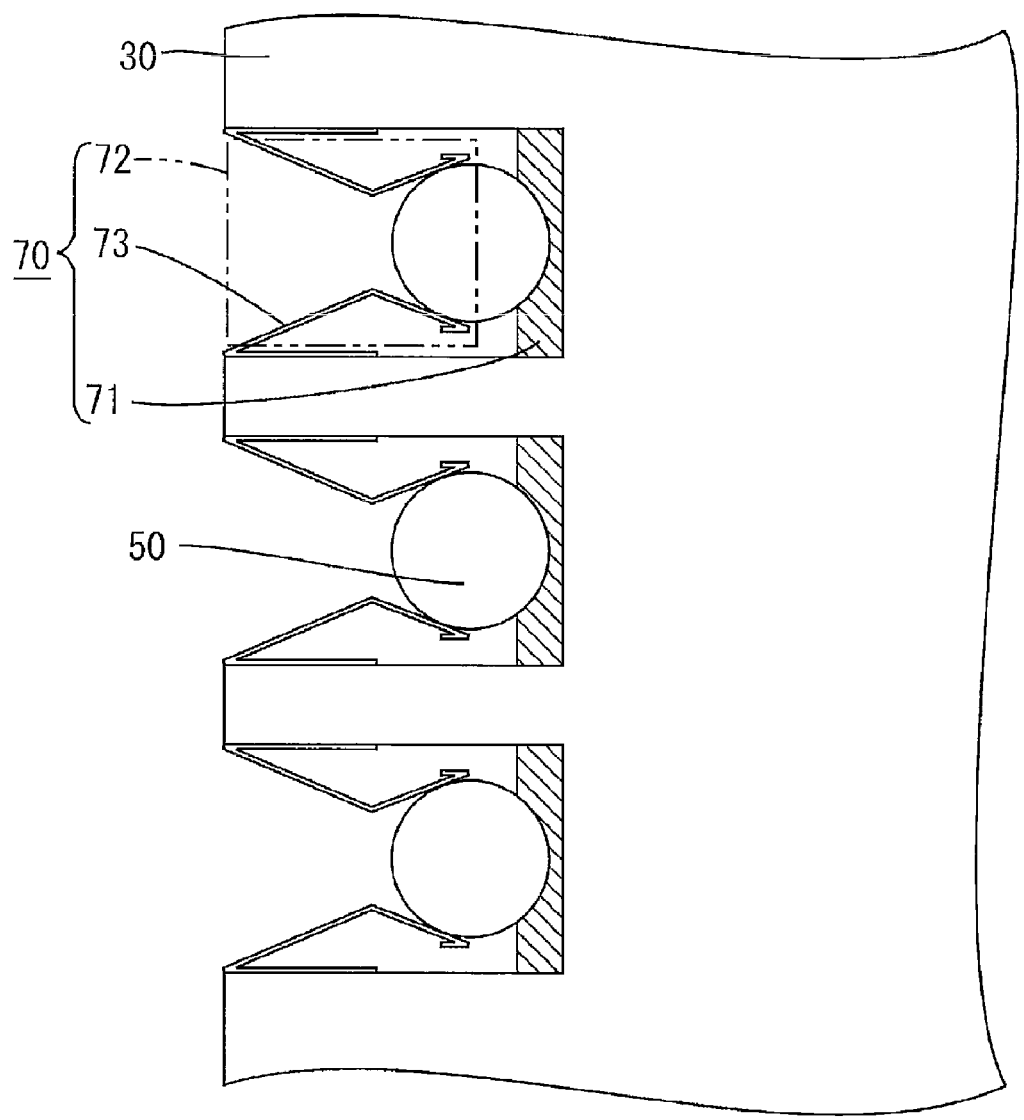
FIG. 5 is a horizontal sectional view illustrating an essential configuration of the inverter board.

FIG. 1 is an exploded perspective view illustrating a schematic configuration of a liquid crystal display apparatus of the present embodiment in accordance with the present invention. FIG. 2 is, likewise, a sectional view of the liquid crystal apparatus along the line A-A. FIG. 3 is, likewise, a sectional view of the liquid crystal apparatus along the line B-B. FIG. 4 is a sectional view illustrating a schematic configuration of an inverter board. FIG. 5 is a horizontal sectional view illustrating an essential configuration of the inverter board.

First, a general configuration of a liquid crystal display apparatus (a display apparatus) 10 of this embodiment will be explained. As illustrated in FIGS. 1 through 3, the liquid crystal display apparatus 10 includes a rectangular liquid crystal panel 11 and a backlight device (an external light source) (a lighting device for use with the display apparatus) 12 that are integrally held by a bezel 13 etc. Out of them, the liquid crystal panel 11 is configured by laminating a pair of glass substrates with a predetermined gap therebetween and sealing liquid crystal between the glass substrates. One of the glass substrates is provided with switching elements (e.g. TFT) connected to source lines and gate lines perpendicularly crossing with each other, pixel electrodes connected to the switching elements, etc. The other one of the glass substrates is provided with common electrodes, a color filter having colored portions such as R, G, B disposed in predetermined arrangement, etc.

Next, the backlight device 12 will be explained. Note that the backlight device 12 is a backlight device of a so-called direct type and is furnished with a plurality of linear light sources (cold cathode tubes (light sources) 17 are used here as HID lamps) right below the back of a panel face (a display face) of the liquid crystal panel 11 and along the panel face.

The backlight device 12 includes a backlight chassis (a chassis) 14 having a substantial box shape with the top face side opened, a plurality of optical members 15 (a diffuser plate, a diffuser sheet, a lens sheet, and an optical sheet, which are illustrated in this order from the bottom side in the figure) attached in a manner covering the opening portion of the backlight chassis 14, and a frame 16 for holding these optical members 15 above the backlight chassis 14. Furthermore, in the backlight chassis 14, the backlight device 12 includes the cold cathode tubes 17, rubber holders 18 for holding both end portions of the respective cold cathode tubes 17, lamp holders 19 that cover a group of the cold cathode tubes 17 and a group of the holders 18 all together, and lamp clips 20 for attaching the cold cathode tubes 17 to the backlight chassis 14. Note that the optical members 15 side in the backlight device 12 of the cold cathode tubes 17 is the light outgoing side.

Each of the cold cathode tubes 17 has an elongated tubular shape and is configured so that a plurality thereof (16 tubes in FIG. 1) are accommodated in the backlight chassis 14 with the longitudinal direction (the axial direction) thereof aligned with the longitudinal direction of the backlight chassis 14. On the other hand, the lamp clips 20 that are for assembling the cold cathode tubes 17 to the backlight chassis 14 function as clip-shaped light-source holding members. The lamp clips 20 are made of synthetic resin (e.g. polycarbonate). Each of the lamp clips 20 is configured so that a plurality thereof are attached to the backlight chassis 14 so as to hold each of the cold cathode tubes 17 at two or three points in the longitudinal direction.

One of the end portions (an end portion at the side where a below-described inverter board 30 is provided) of each of the cold cathode tubes 17 is electrically connected to an electro-conductive terminal 50 (see FIG. 3). The terminals 50 are disposed over a certain length in the direction along axes of the respective cold cathode tubes 17 and on a single side in a longitudinal direction on the flat face (the inner face) of the backlight chassis 14, the flat face facing the cold cathode tubes 17. Each of the terminals 50 has an end portion standing from the inner face of the backlight chassis 14 and connected to the end portion of one of the cold cathode tubes 17. Each terminal 50 has the other end portion that has a column shape protruding in a manner penetrating the backlight chassis 14 to a side opposite from a side where the cold cathode tubes 17 are disposed. The other end portions of the terminals 50 have an aspect connected to the below-described inverter board 30.

Note that it is only necessary for the material configuring the terminals 50 to be electro-conductive, and the material can be suitably selected from metal such as copper, brass, iron, electrically-conductive resin, etc.

The backlight chassis 14 is configured mainly by a metal sheet metal. The backlight chassis 14 has a light reflection face on the inner face side (the light source side) thereof. The light reflection face is formed with a light reflection sheet 14a.

By the backlight chassis 14 including this light reflection sheet 14a, light emitted from the cold cathode tubes 17 can be reflected to a side of the optical members 15 such as the diffuser plate. The light reflection sheet 14a can be configured by, for example, a light reflective resin sheet etc.

Furthermore, the inverter board 30 and an inverter cover 40 are attached at a single side in the longitudinal direction of the backlight chassis 14 and on a face (an outer face) of the backlight chassis 14, the face being opposite from the side where the cold cathode tubes 17 are disposed.

The inverter cover 40 is for protecting the inverter board 30. The inverter cover 40 is configured with, for example, an insulating sheet. The inverter cover 40 has a substantial box shape with a side of the backlight chassis 14 opened. Furthermore, the inverter cover 40 has a shape that lacks a side face out of four side faces of the inverter cover 40, the side face existing on the end portion side in the longitudinal direction of the backlight chassis 14. Furthermore, the inverter cover 40 is screwed up through screw holes pierced in four corners thereof to the backlight chassis 14, and a space portion 60 is formed between the inverter cover 40 and the backlight chassis 14. The space portion 60 has an opening on the end portion side in the longitudinal direction of the backlight chassis 14.

The inverter board 30 is, with an aspect fitted in the space portion 60 formed between the backlight chassis 14 and the inverter cover 40, attached at the single side in the longitudinal direction of the backlight chassis 14 so as to supply drive voltage to the end portions of the cold cathode tubes 17. More specifically, as illustrated in FIG. 2, a pair of groove portions 21 are constructed in the direction along the axial direction of the cold cathode tubes 17 (i.e. the longitudinal direction of the backlight chassis 14) on the outer face of the backlight chassis 14; and, in the space portion 60, the inverter board 30 is fitted in the backlight chassis 14 in a manner following the groove portions 21; that is, two end portions (opposing two sides) of the inverter board 30 are fitted in the groove portions 21 so as to allow the inverter board 30 to be inserted into and detached from the space portion 60 as desired.

In a case where attachment of the inverter board 30 is desired, the two end portions of the inverter board 30 are fitted in the groove portions 21 and, while the inverter board 30 are slid along the groove portions 21, are inserted into the inside of the space portion 60. On the other hand, in a case where detachment of the inverter board 30 is desired, by force applied to pull the inverter board 30 out in a direction parallel to the flat face of the backlight chassis 14 whereon the inverter board 30 is attached, the inverter board 30 is gradually pulled out in the manner following the groove portions 21 wherein its two sides are fitted. At this time, because there is no engaging body (e.g. screwing with a screw) that prevents the inverter board 30 from being pulled out, the inverter board 30 can be easily pulled out without resistance only by being applied with the force in the direction to be pulled out. Thus, the inverter board 30 can be detached without accompanied with any troublesome operation.

The inverter board 30 is made of resin having a rectangular shape and includes an inverter circuit member 31 as illustrated in FIG. 4. The inverter circuit member 31 is a circuit member such as a transformer that generates high-frequency voltage as the drive voltage for the cold cathode tubes 17. The inverter circuit member 31 is connected to electrode portions 71 via electrically-conductive paths 32. The electrode portions 71 are included in receiving portions 70 formed in the inverter board 30.

The plurality of receiving portions 70 are formed in one side out of four sides of the rectangular-shaped inverter board 30, the one side existing on the center side in the longitudinal direction of the backlight chassis 14. As illustrated in FIG. 5, the receiving portions 70 have an aspect being in a state where parts of the inverter board 30 are concaved. The receiving portions 70 are configured with insertion-detachment allowing portions 72 and the electrode portions 71. Furthermore, the terminals 50 connected to the respective cold cathode tubes 17 are received by the respective receiving portions 70 and are electrically connected to the electrode portions 71.

The plurality (16 pieces that is the same number as the number of the cold cathode electrodes in this embodiment) of terminals 50 are arranged in a straight line on the face (the outer face) of the backlight chassis 14, the face being opposite from the side where the cold cathode tubes 17 are disposed. On the other hand, the receiving portions 70 of the same number (16 pieces in this embodiment) as the number of the terminals 50 is formed in a straight line in the one side of the inverter board 30. These terminals 50 and the receiving portions 70 are configured such that, accompanying insertion of the inverter board 30 into the space portion 60, the terminals 50 are received by the corresponding receiving portions 70, and, by this reception, the terminals 50 are connected to the electrode portions 71 included in the respective receiving portions 70. Thus, in this embodiment, at the same time with insertion of the inverter board 30 into the space portion 60, the inverter board 30 and the terminal 50 are electrically connected together.

The electrode portions 71 provided in back portions in the receiving portions 70 are made of, for example, copper alloy. Each of the electrode portions 71 has a concave along an arc of the circle of the column-shaped terminal 50, and a part of the outer circumference of the terminal 50 is in a state fitted in the concave (see FIG. 5). The electrode portions 71 are connected to the inverter circuit 31 via the electrically-conductive paths 32, and the terminals 50 are connected to the cold cathode tubes 17. Therefore, it is configured such that the inverter circuit 31 and the cold cathode tubes 17 are electrically connected together through the electrode portions 71 and the terminals 50, and the configuration is such that drive voltage can be supplied from the inverter circuit 31 to the cold cathode tubes 17.

Furthermore, the insertion-detachment allowing portions 72 are provided on both side portions in the receiving portions 70. Each of the insertion-detachment allowing portions 72 is configured by a pair of plate springs (elastic members) 73 opposed to each other. The insertion-detachment allowing portions 72 have a function to allow insertion and detachment of the terminals 50. Specifically, in this embodiment, each of the insertion-detachment allowing portions 72 has an opening formed between the pair of plate springs 73 and having a width smaller than the width of the terminal 50, while the plate springs 73 abut on the terminal 50. Thus, the terminal 50 is substantially secured to the receiving portion 70.

Note that the plate springs 73 are configured by, for example, stainless steel (SUS301, SUS304), steel strips (SK-5), copper alloy, etc. In addition, the material of the plate springs 73 may be replaced with any arbitrary one that elastically deforms so that the terminals 50 can pass therethrough by expanding the openings of the insertion-detachment allowing portions 72 when the terminals 50 pass therethrough. For example, the plate springs 73 may be replaced with synthetic rubbers etc.

With the liquid crystal display apparatus 10 of this embodiment of the above configuration, effects as follows can be achieved:

The inverter board 30 included in the liquid crystal display apparatus (display apparatus) 10 of this embodiment is configured to be slid in the direction parallel to the flat face of the backlight chassis (chassis) 14, the face facing the cold cathode tubes (light sources) 17 disposed in the parallel arrangement so as to be attached and detached. Thus, the inverter board 30 can be detached without accompanied with any troublesome operation.

The inverter board 30 is attached to the backlight chassis 14 with the configuration as follows: the pair of groove portions 21 extending in the longitudinal direction of the backlight chassis 14 is constructed on the face (outer face) of the backlight chassis 14, the outer face being opposite from the side where the cold cathode tubes 17 are disposed, and the inverter board 30 is fitted in the backlight chassis 14 in the manner following the groove portions 21.

In the case where detachment of the inverter board 30 is desired, force to pull the inverter board 30 out of the space portion 60 in the direction parallel to the flat face of the backlight chassis 14 is applied. Then, because there is no engaging body that prevents the inverter board 30 from being pulled out, the inverter board 30 can be easily pulled out without resistance only by being applied with the force in the pulling out direction, and the inverter board 30 can be detached without accompanied with any troublesome operation.

Furthermore, in this embodiment, the inverter cover (laminated substrate) 40 is attached to the backlight chassis 14 by screwing in the aspect layered to the inverter board 30, while the inverter board 30 is configured to be capable of being inserted into and detached from the space portion 60 formed between the inverter cover 40 and the backlight chassis 14. Accordingly, in the case where detachment of the inverter board 30 is desired, it is unnecessary to detach the screw that engages the inverter cover 40 first, detach the inverter cover 40 and, thereafter, start the operation to detach the inverter board 30; the inverter board 30 can be pulled out of the space portion 60 in the sate with the inverter cover 40 attached to the backlight chassis 14. As a result of this, the operation to detach the inverter board 30 is still more simplified.

Furthermore, in this embodiment, the terminals 50 connected to the cold cathode tubes 17 protrude to the outer face of the backlight chassis 14, and, accompanying insertion of the inverter board 30 into the space portion 60, the terminals 50 and the inverter board 30 can be electrically connected together. That is, at the same time with insertion of the inverter board 30 into the space portion 60, the cold cathode tubes 17 and the inverter board 30 comes into the state where energization is available via the terminals 50.

Meanwhile, a configuration for the cold cathode tubes 17 and the inverter board 30 to be energized together via a harness is conventionally usual, and, in the case where detachment of the inverter board 30 is desired, the operation to pull the harness out of the inverter board 30 first is necessary. In this embodiment, the operation to pull the inverter board 30 and the terminals 50 out is unnecessary; connection between the inverter board 30 and the terminals 50 are eliminated only with the operation to pull the inverter board 30 out of the space portion 60. Therefore, the operation to detach the inverter board 30 is still more simplified.

Furthermore, specifically in this embodiment, the inverter board 30 is furnished with the receiving portions 70 including the electrode portions 71, and, accompanying insertion of the inverter board 30 into the space portion 60, the terminals 50 are received by the receiving portions 70 and abut on the electrode portions 71 so as to be electrically connected thereto. Thus, because of the configuration for the terminals 50 to be received by the receiving portions 70, the electrical connection between the terminals 50 and the inverter board 30 is still more reliable, and, by extension, the electrical connection between the cold cathode tubes 17 and the inverter board 30 is reliable and steady.

Furthermore, in this embodiment, the receiving portions 70 are provided with the insertion-detachment allowing portions 72 that allows insertion and detachment of the terminals 50, and the insertion-detachment allowing portions 72 are configured with the plate springs (elastic member) 73. Thus, in order that the terminals 50 pass the insertion-detachment allowing portions 72, it is necessary that force to the extent that the plate springs 73 elastically deform be applied. With this configuration, the terminals 50 can be prevented from easily passing the insertion-detachment allowing portions 72 and being detached from the receiving portions 70 with shaking when the backlight device 12 (the lighting device for use with the display apparatus) or the liquid crystal display apparatus 10 are used, and drive voltage is still more steadily supplied from the inverter board 30 to the cold cathode tubes 17.

Next, various modifications of the liquid crystal display apparatus 10 of this embodiment will be explained.

Figure 6:
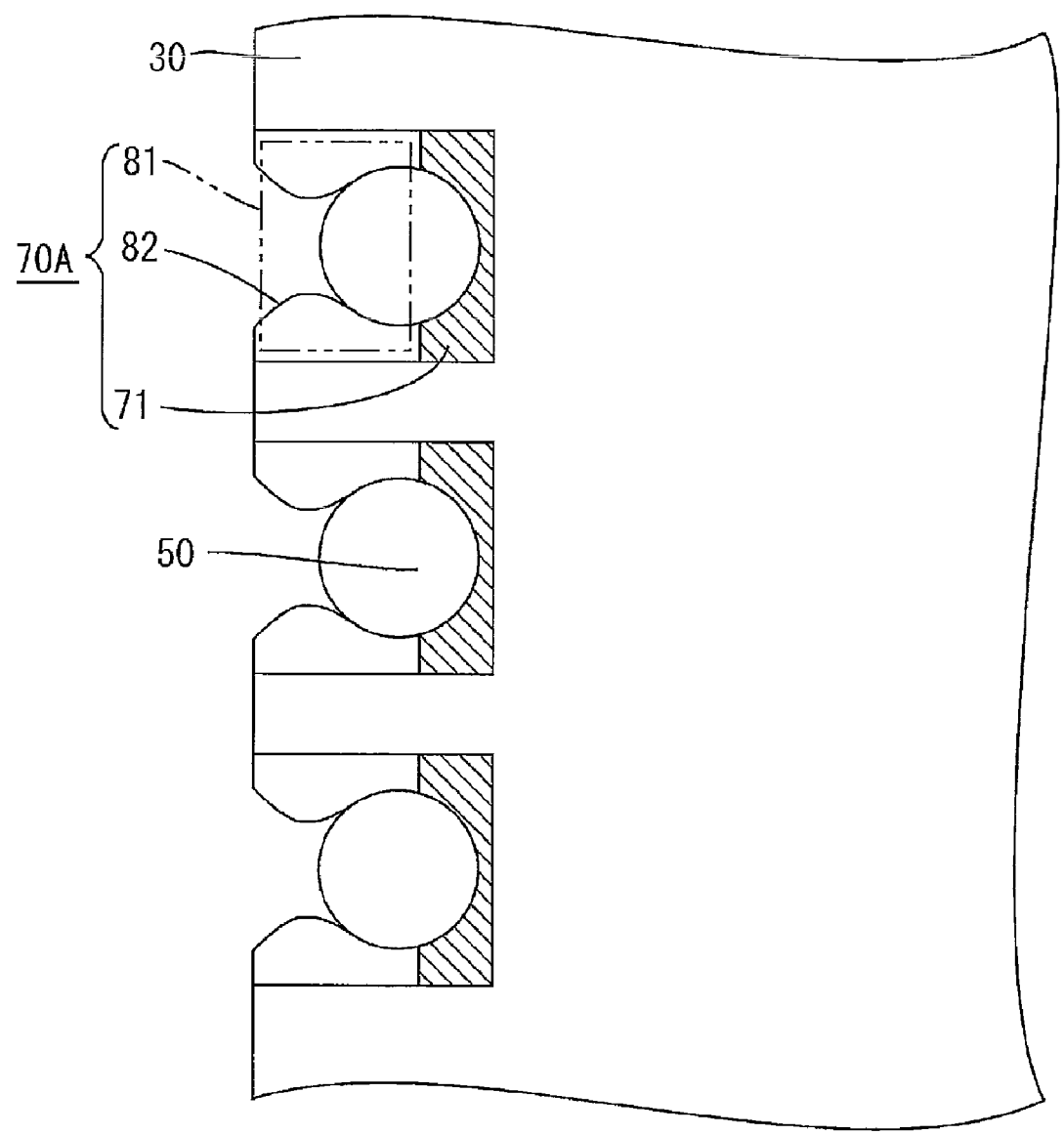
FIG. 6 is a horizontal sectional view illustrating an essential configuration of the inverter board concerning a modification of the liquid crystal apparatus.

FIG. 6 is a horizontal sectional view illustrating a modification of the receiving portions. Receiving portions 70A illustrated in FIG. 6 have, differently from the receiving portions 70, shapes wrapping along the shapes of the terminals 50, while the insertion-detachment allowing portions 81 are configured by synthetic rubbers 82 having a larger elastic modulus.

By wrapping the substantially entire outer circumferences of the terminals 50 with the synthetic rubbers 82 having the larger elastic modulus and the electrode portions 71, the terminals 50 can be still more reliably secured to the receiving portions 70A, and, by extension, drive voltage can be steadily supplied from the inverter board 30 to the cold cathode tubes 17.

Figure 7:
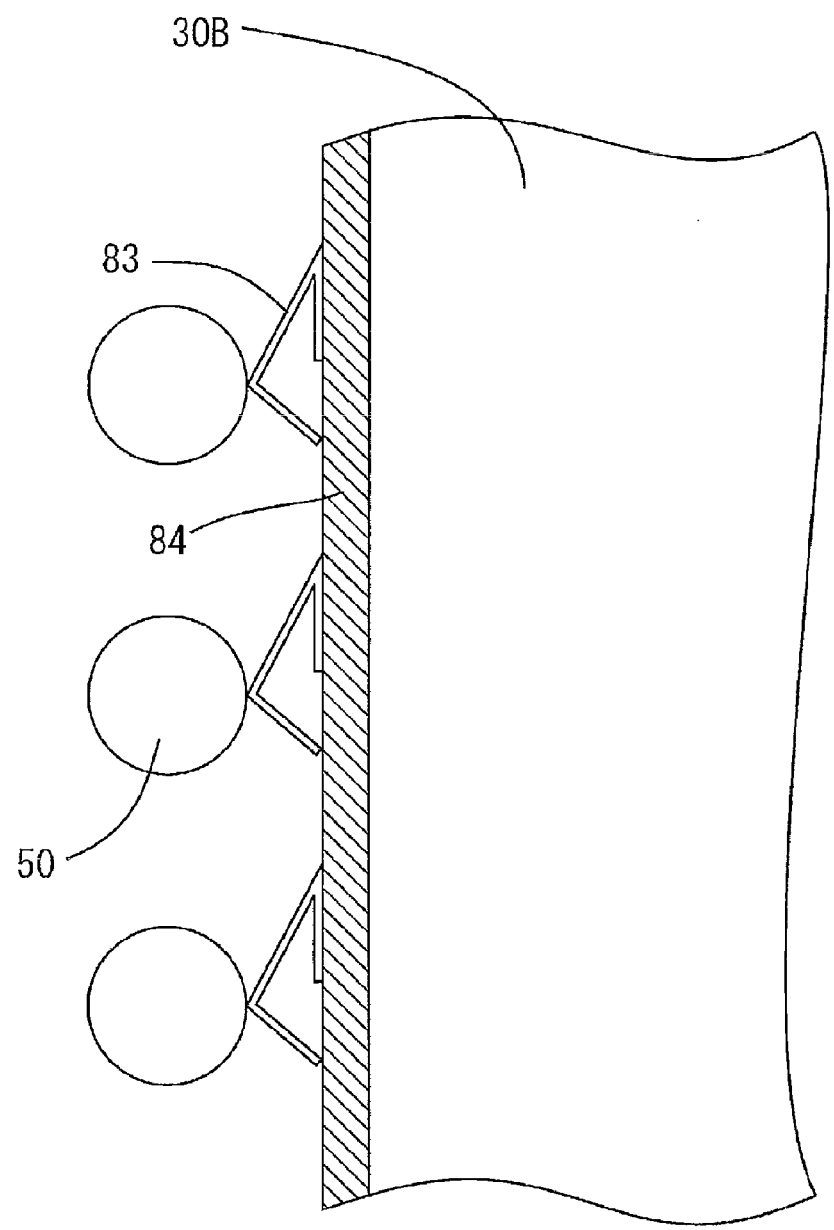
FIG. 7 is a horizontal sectional view illustrating an essential configuration of the inverter board concerning a modification of the liquid crystal apparatus.

FIG. 7 is a horizontal sectional view illustrating a modification of the inverter board. Differently from the one furnished with the receiving portions 70 in a state where parts of the inverter board 30 are concaved, an inverter board 30B illustrated in FIG. 7 is provided with plate springs 83 and an electrode portion 84 along a side of the rectangular inverter board 30B.

In a case of this configuration, accompanying elastic deformation of the plate springs 83 electrically connected to the electrode portion 84, the terminals 50 are substantially secured in a state abutting on the plate springs 83 so that drive voltage can be steadily supplied from the inverter board 30B to the cold cathode tubes 17. Furthermore, because the plate springs 83 and the electrode portion 84 are simply annexed to one side of the inverter board 30B, the configuration of the inverter board 30B can be simplified.

Figure 8:
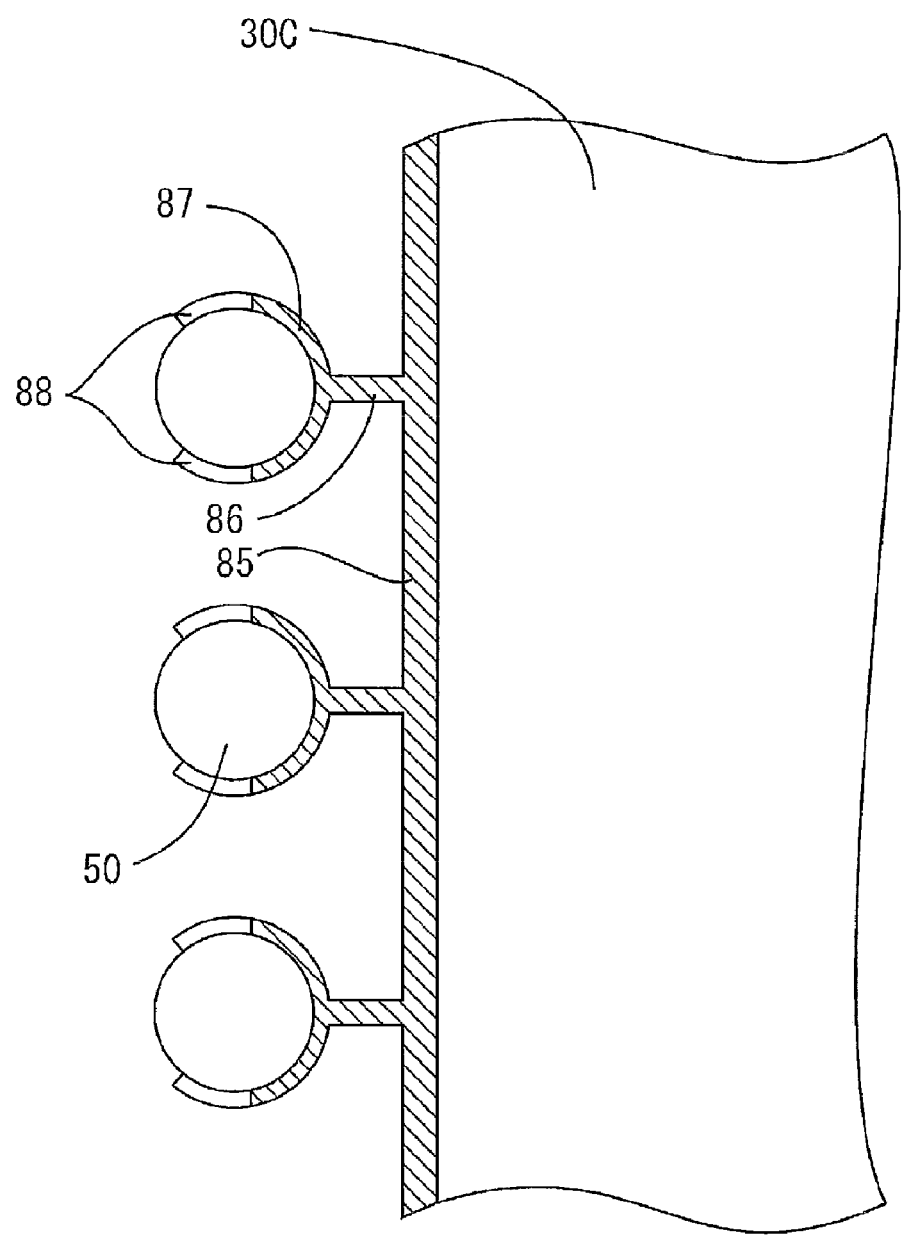
FIG. 8 is a horizontal sectional view illustrating an essential configuration of the inverter board concerning a modification of the liquid crystal apparatus.

FIG. 8 is a horizontal sectional view illustrating a modification of the inverter board. Differently from the one furnished with the receiving portions 70 in a state where parts of the inverter board 30 are concaved, an inverter board 30C illustrated in FIG. 8 has legs 86 and holding portions 87. The legs 86 protrude from a surface of an electrode portion 85 provided along one side of the rectangular inverter board 30C. The C-ring shaped holding portions 87 are included at the distal ends of the legs 86 and their circumferential parts are opened. Both the legs 86 and the holding portions 87 are configured by a material having the same electro-conductivity as the electro-conductivity of the electrode portion 85. In addition, two distal ends of each of the holding portions 87 are provided with elastically deformable synthetic resin 88.

Also in a case of this configuration, the synthetic resin 88 deforms in the direction apart from each other and to expand the openings. Therefore, terminals 50 are fitted in the holding portions 87 and are held by the holding portions 87 and the synthetic resin 88. Therefore, drive voltage can be steadily supplied from the inverter board 30C to the cold cathode tubes 17. Furthermore, because the electrode portion 85, the legs 86, the holding portions 87 and the synthetic resin 88 are simply annexed to one side of the inverter board 30C, the configuration of the inverter board 30C can be simplified.

Figure 10:
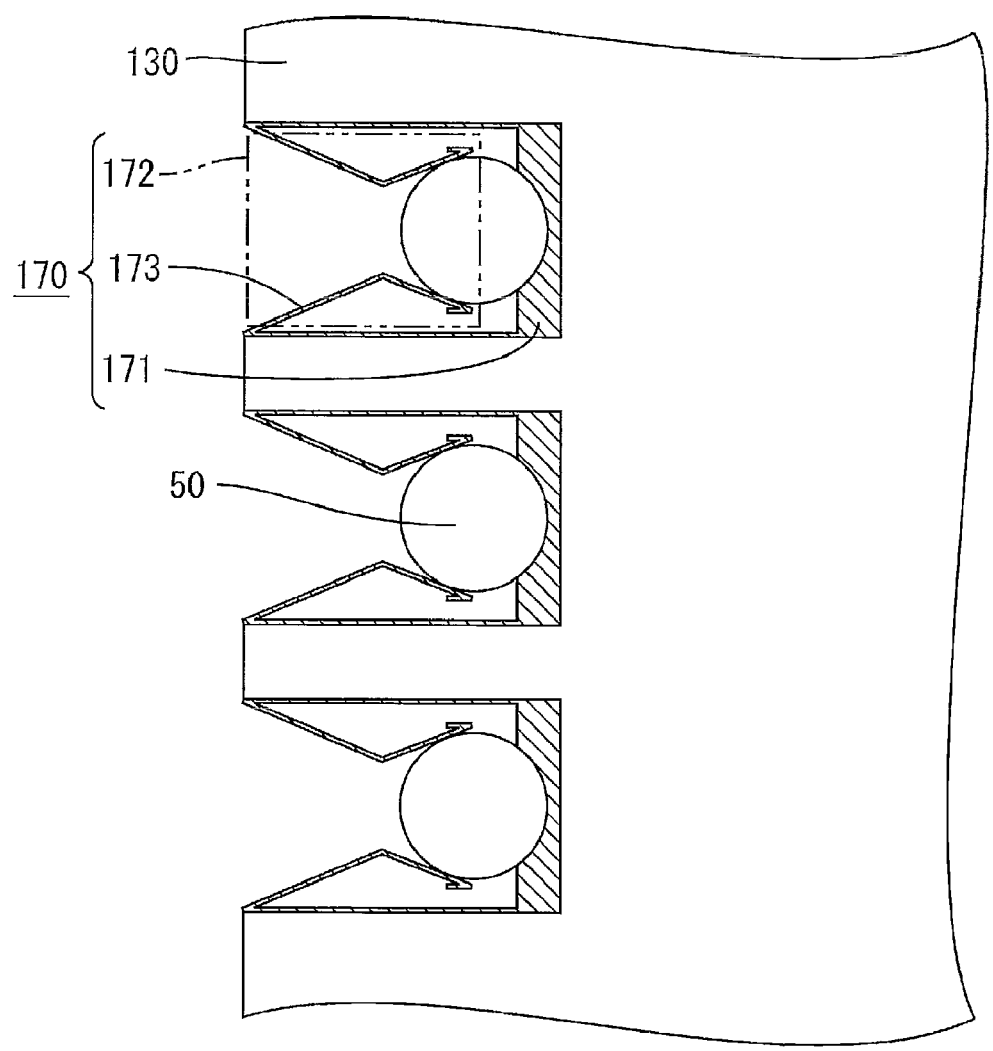
FIG. 10 is a horizontal sectional view illustrating an essential configuration of the inverter board concerning a modification of the liquid crystal apparatus.

FIG. 10 is a horizontal sectional view illustrating a modification of the inverter board. An inverter board 130 illustrated in FIG. 10 has receiving portions 170 wherein electrode portion 171 and plate springs 173 are integrally formed, i.e. insertion-detachment allowing portions 172 are configured by the plate springs 173 integrally continuing from the electrode portions 171. Also in a case of this configuration, accompanying deformation of the plate springs 173 in the directions apart from each other to expand the openings by elastic deformation, the terminals 50 are fitted in the receiving portions 170 and are stably held in the electrically continued state by the plate springs 173 and the electrode portions 171. Therefore, drive voltage can be steadily supplied from the inverter board 130 to the cold cathode tubes 17.

Figure 11:
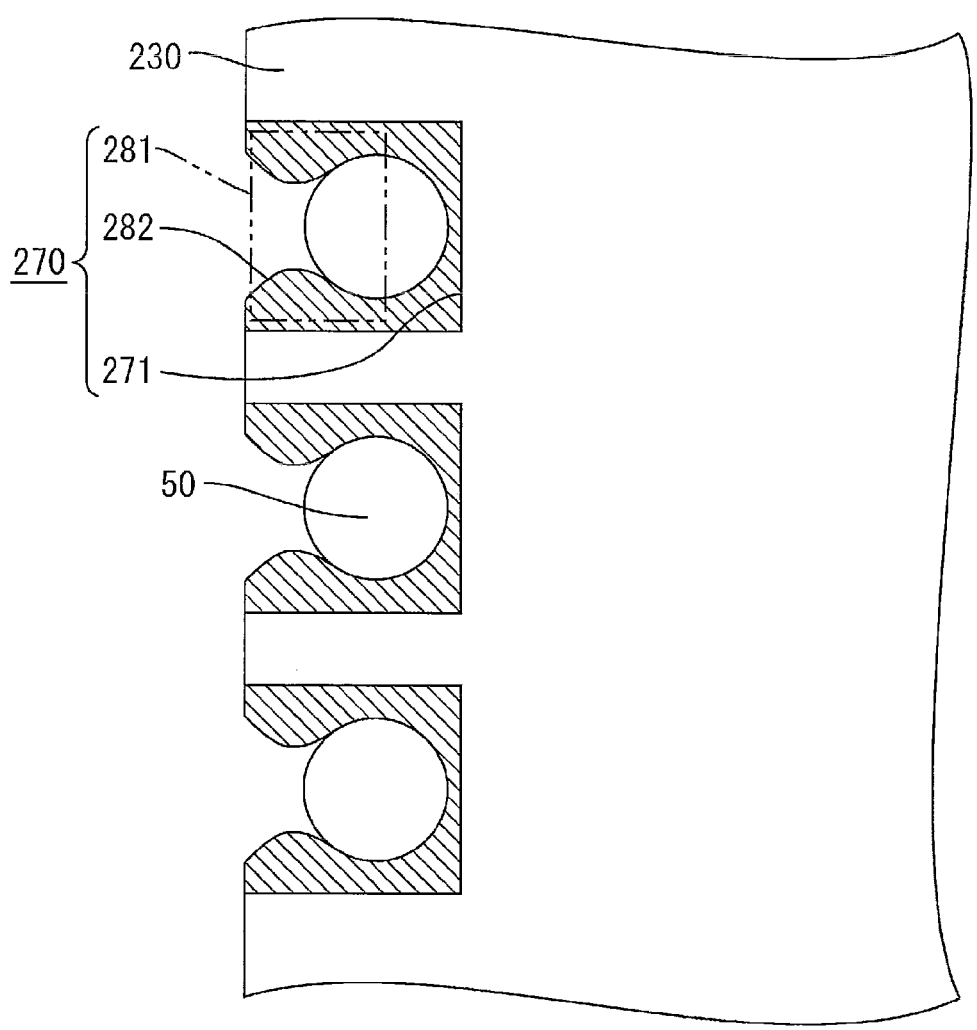
FIG. 11 is a horizontal sectional view illustrating an essential configuration of the inverter board concerning a modification of the liquid crystal apparatus.

FIG. 11 is a horizontal sectional view illustrating a modification of the inverter board. An inverter board 230 illustrated in FIG. 11 has receiving portions 270 having a shape wrapping along a shape of the terminals 50, insertion-detachment allowing portions 281 configured by electrically-conductive rubbers 282 having a larger modulus of elasticity, and electrode portions 271 formed with the electrically-conductive rubbers 282. The substantially entire outer circumferences of the terminals 50 are wrapped with the electrically-conductive rubbers 282 using the electrically-conductive rubbers 282 having the larger modulus of elasticity. Therefore, the terminals 50 can be reliably secured to the receiving portions 270, and, by extension, drive voltage can be steadily supplied from the inverter board 230 to the cold cathode tubes 17.

Figure 12:
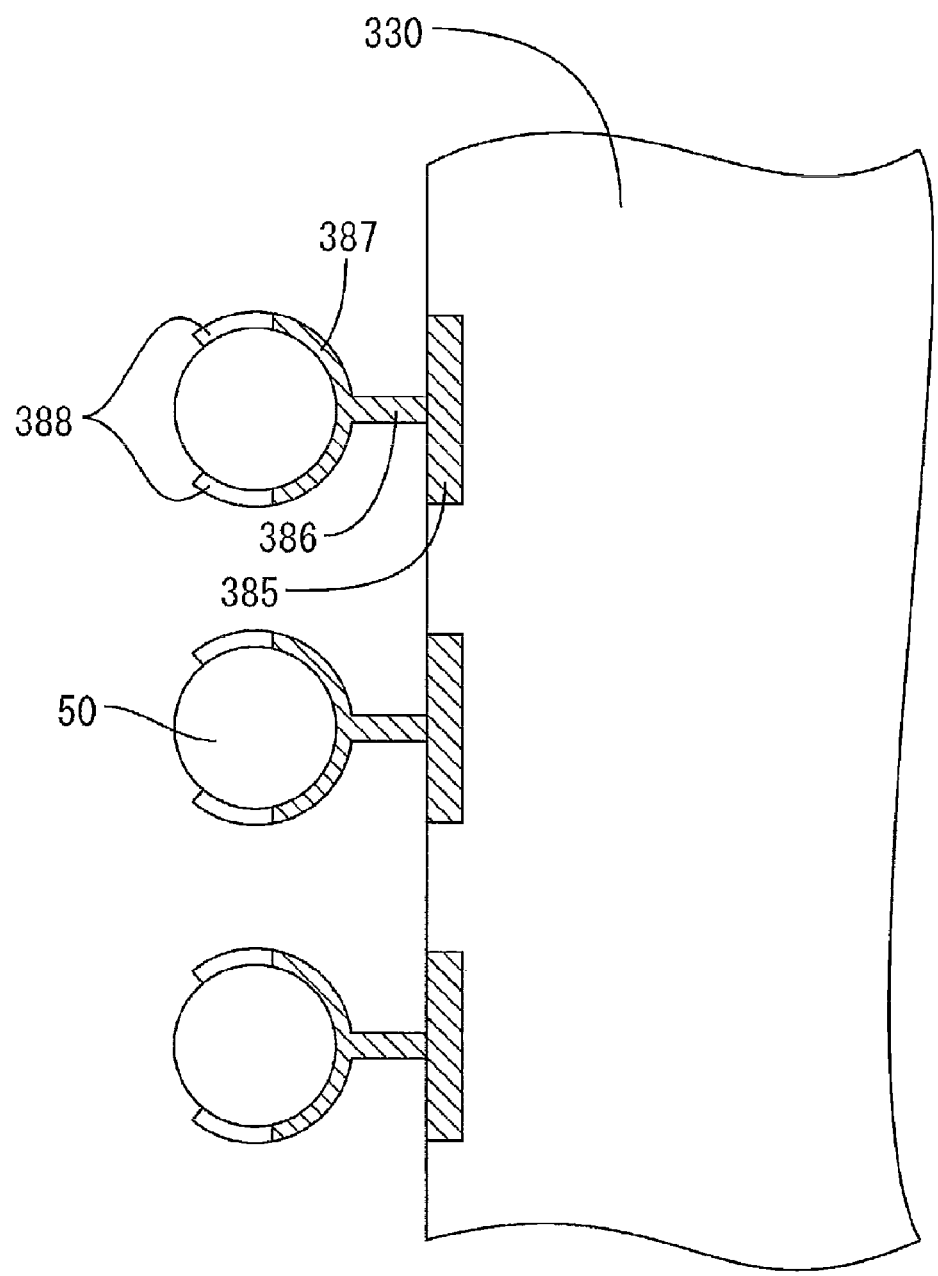
FIG. 12 is a horizontal sectional view illustrating an essential configuration of the inverter board concerning a modification of the liquid crystal apparatus.

FIG. 12 is a horizontal sectional view illustrating a modification of the inverter board. Contrary to the inverter board 30C illustrated in FIG. 8, an inverter board 330 has a configuration replacing the electrode portion 85 with electrode portions 395 separated for each terminal 50. Even with this configuration, the synthetic resin 388 deforms in the directions apart from each other to expand the openings so that the terminals 50 are fitted in holding portions 387 and are held by the holding portions 387 and synthetic resin 388. Therefore, drive voltage can be steadily supplied from the inverter board 330 to the cold cathode tubes 17.

Figure 13:
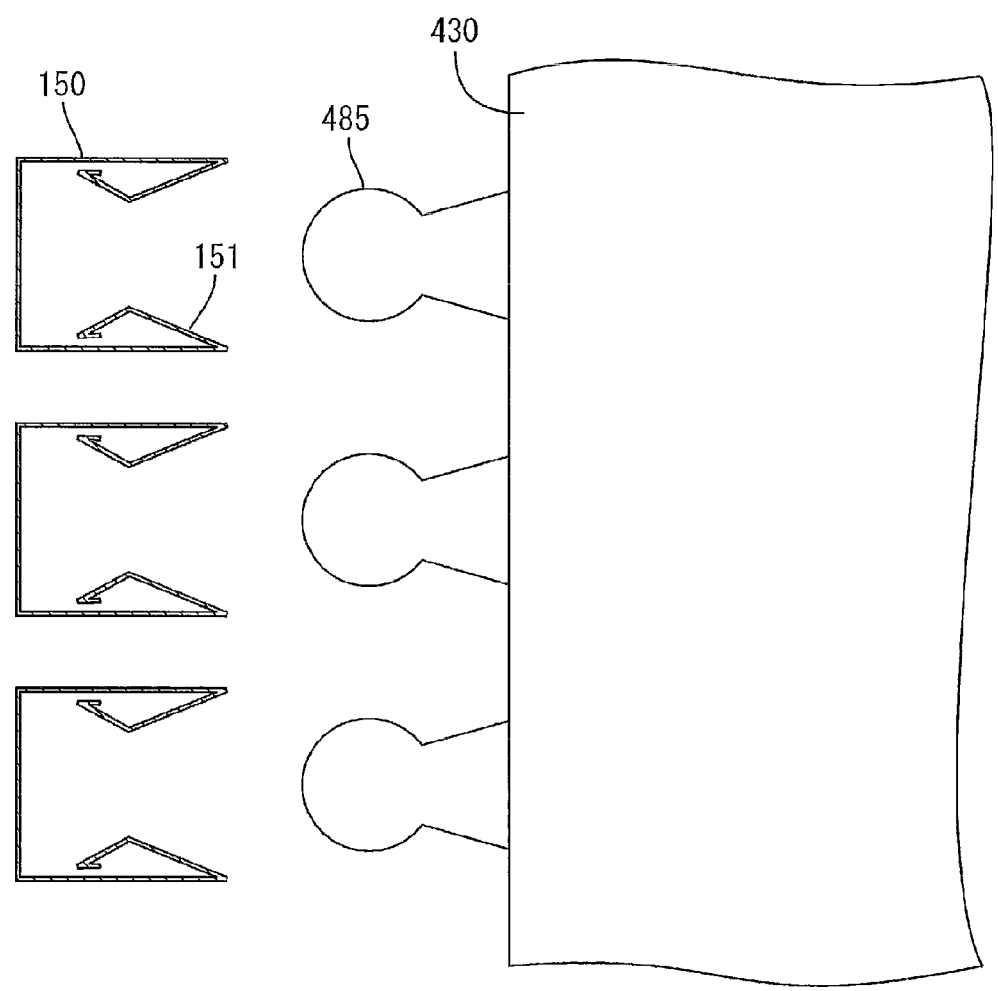
FIG. 13 is a horizontal sectional view illustrating an essential configuration of the inverter board concerning a modification of the liquid crystal apparatus.

FIG. 13 is a horizontal sectional view illustrating a modification of the inverter board. In the illustration of FIG. 13, while an inverter board 430 includes electrode portions 485, terminals 150 substituted for the terminals 50 are configured to allow insertion and detachment of the electrode portions 485. That is, the terminals 150 include plate springs 151, so that the electrode portions 485 of the inverter board 430 can be inserted into and detached from the insides (the receiving portions) as desired, and, accompanying the insertion and detachment, the terminals 150 can be electrically continued with the electrode portions 485.

Figure 14:
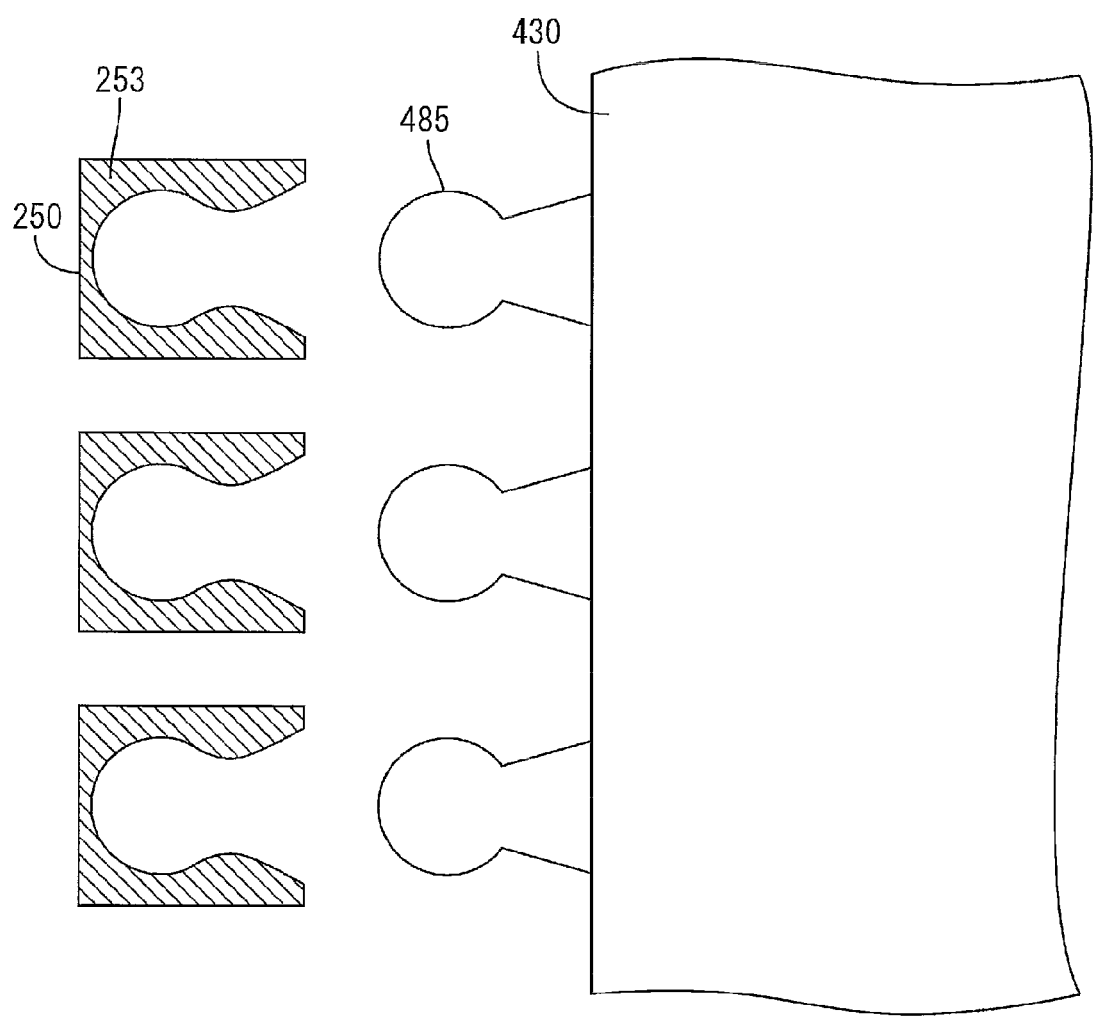
FIG. 14 is a horizontal sectional view illustrating an essential configuration of the inverter board concerning a modification of the liquid crystal apparatus.

FIG. 14 also is a horizontal sectional view illustrating a modification of the inverter board. Also in the illustration of FIG. 14, while an inverter board 430 includes the electrode portions 485, terminals 250 substituted for the terminals 50 are configured to allow insertion and detachment of the electrode portions 485. That is, the terminals 250 are configured by electrically-conductive rubbers 253 having a larger modulus of elasticity, so that the electrode portions 485 of the inverter board 430 can be inserted into and detached from the insides (the receiving portions) as desired, and, accompanying the insertion and detachment, the terminals 250 can be electrically continued with the electrode portions 485.

Figure 15:
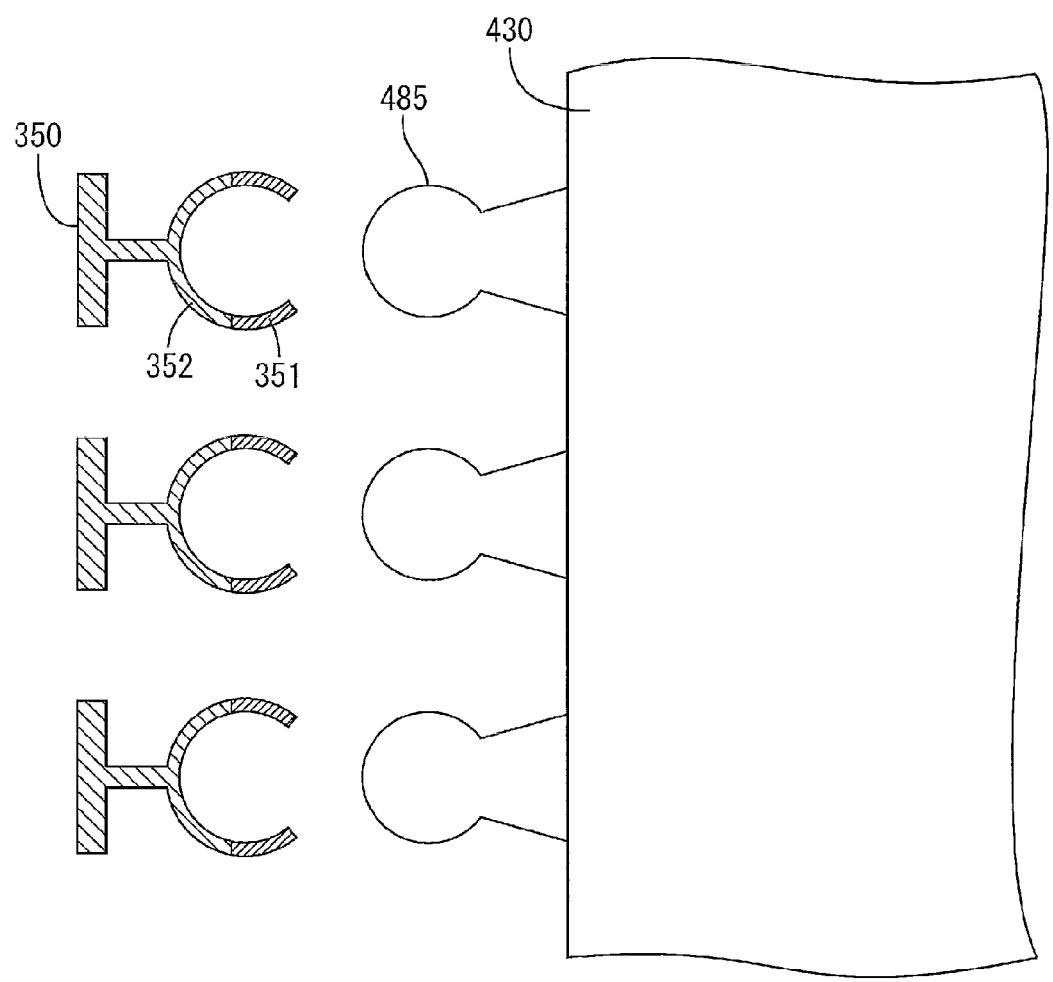
FIG. 15 is a horizontal sectional view illustrating an essential configuration of the inverter board concerning a modification of the liquid crystal apparatus.

FIG. 15 also is a horizontal sectional view illustrating a modification of the inverter board. Also in the illustration of FIG. 15, while the inverter board 430 includes the electrode portions 485, terminals 350 substituted for the terminals 50 are configured to allow insertion and detachment of the electrode portions 485. That is, the terminals 350 has holding portions 352 and elastically deformable synthetic resin portions 352, and the synthetic resin portions 352 elastically deform, so that the electrode portions 485 can be inserted into and detached from the insides (the receiving portions) as desired, and, accompanying the insertion and detachment, the terminals 350 can be electrically continued with the electrode portions 485.

Figure 16:
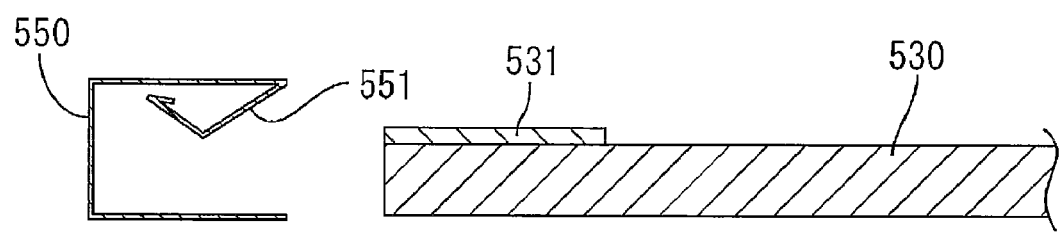
FIG. 16 is a vertical sectional view illustrating an essential configuration of the inverter board concerning a modification of the liquid crystal apparatus.
Figure 19:
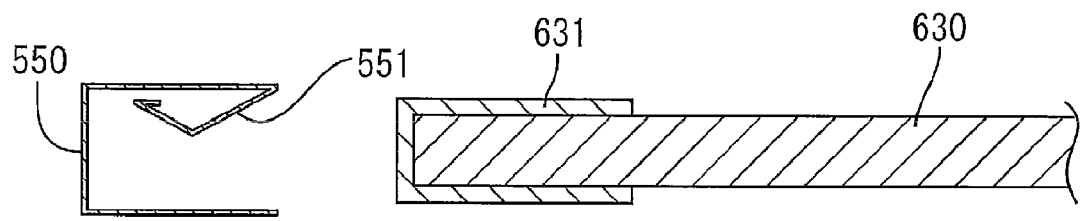
FIG. 19 is a vertical sectional view illustrating an essential configuration of the inverter board concerning a modification of the liquid crystal apparatus.

FIG. 16 is a vertical sectional view illustrating a modification of the inverter board. In the illustration of FIG. 16, while an inverter board 530 includes an electrode portion 531 formed on the surface thereof by plating, a terminal substituted for the terminals 50 is configured to allow insertion and detachment of the electrode portion 531. That is, a terminal 550 has a plate spring 551 that elastically deforms in the thicknesswise direction of the inverter board 530, so that, by the elastic deformation, the electrode portion 531 can be inserted and detached as desired, and, accompanying the insertion and detachment, the terminal 550 the electrode portion 531 formed on the surface of the inverter board 530 can be electrically continued therebetween. Note that the electrode portion of the inverter board in this case may be, for example, as illustrated in FIG. 19, a terminal 631 annexed to an end portion of a board 630 by soldering etc.

Figure 17:
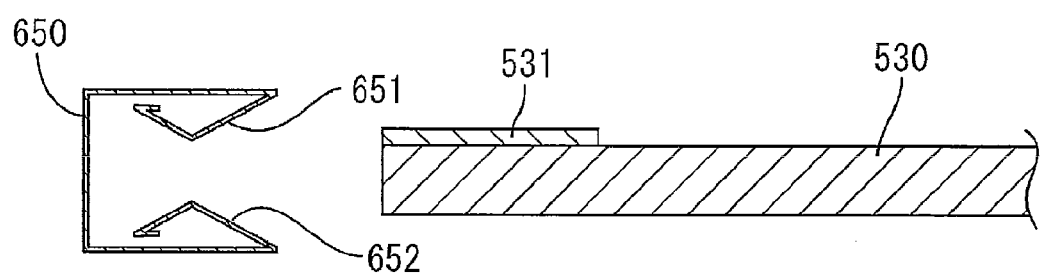
FIG. 17 is a vertical sectional view illustrating an essential configuration of the inverter board concerning a modification of the liquid crystal apparatus.
Figure 20:
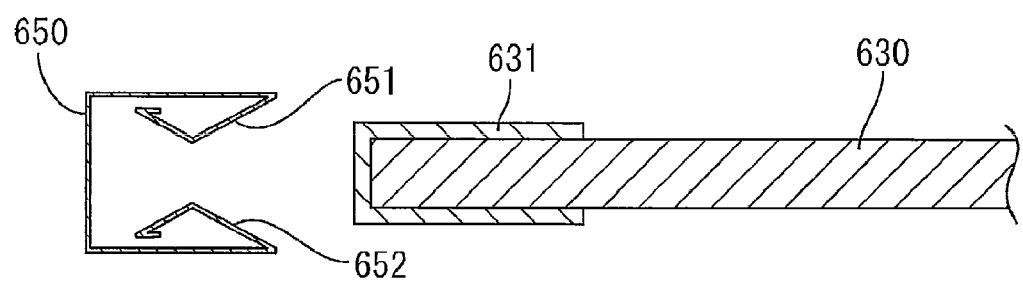
FIG. 20 is a vertical sectional view illustrating an essential configuration of the inverter board concerning a modification of the liquid crystal apparatus.

FIG. 17 is a vertical sectional view illustrating a modification of the inverter board. Also in the illustration of FIG. 17, while the inverter board 530 includes the electrode portion 531 formed on the surface thereof by plating, a terminal 650 substituted for the terminals 50 allows insertion and detachment of the electrode portion 531. That is, the terminal 650 has a pair of plate springs 651, 652 that elastically deform in the thicknesswise direction of the inverter board 530, so that, by the elastic deformation, the electrode portion 531 of the inverter board 530 can be inserted and detached as desired, and, accompanying the insertion and detachment, the terminal 650 and the electrode portion 531 formed on the surface of the inverter board 530 can be electrically continued therebetween. Note that the electrode portion of the inverter board in this case may be, for example, as illustrated in FIG. 20, the terminal 631 annexed to the end portion of the board 630 by soldering etc.

Figure 18:
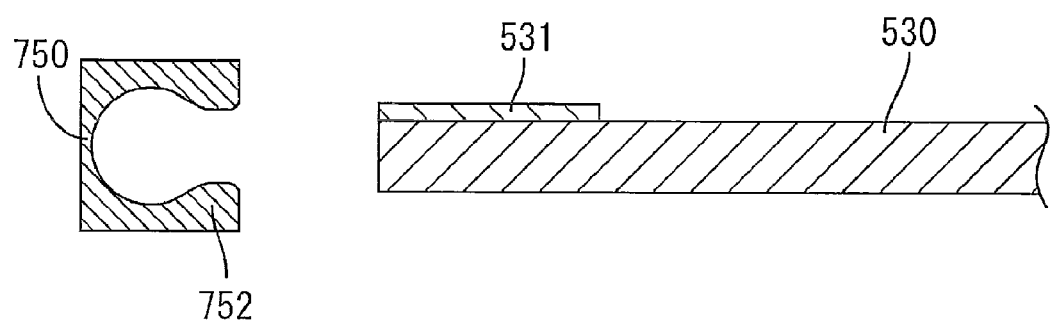
FIG. 18 is a vertical sectional view illustrating an essential configuration of the inverter board concerning a modification of the liquid crystal apparatus.
Figure 21:
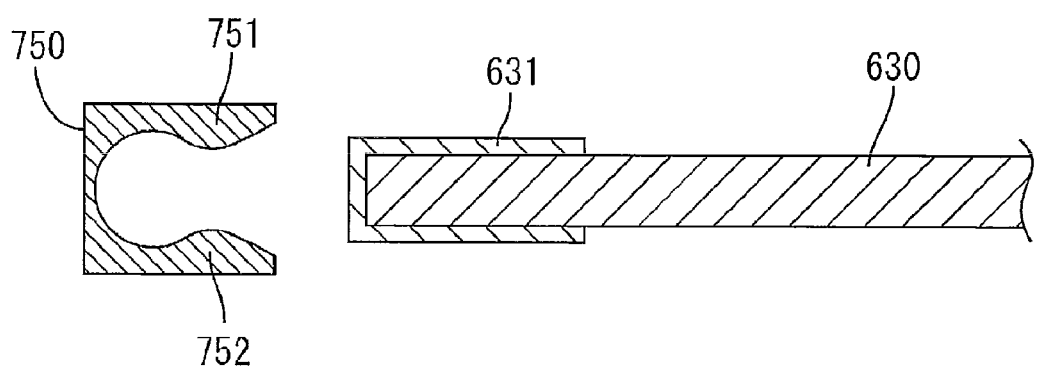
FIG. 21 is a vertical sectional view illustrating an essential configuration of the inverter board concerning a modification of the liquid crystal apparatus.

FIG. 18 is a vertical sectional view illustrating a modification of the inverter board. Also in the illustration of FIG. 18, while the inverter board 530 includes the electrode portion 531 formed on the surface thereof by plating, a terminal 750 substituted for the terminals 50 are configured to allow insertion and detachment of the electrode portion 531. That is, the terminal 750 is configured by an electrically-conductive rubber 752 that has a larger modulus of elasticity and elastically deforms in the thicknesswise direction of the inverter board 530, so that, by the elastic deformation, the electrode portion 531 of the inverter board 530 can be inserted and detached as desired, and, accompanying the insertion and detachment, the terminal 750 and the electrode portion 531 formed on the surface of the inverter board 530 can be electrically continued therebetween. Note that the electrode portion of the inverter board in this case may be, for example, as illustrated in FIG. 21, the terminal 631 annexed to the end portion of the board 630 by soldering etc.

OTHER EMBODIMENTS

While the embodiment and its modifications in accordance with the present invention are illustrated as above, the present invention is not limited to the embodiment and the modifications explained as above with reference to the drawings; for example, the following embodiments also are included within the scope of the present invention.

(1) The above-explained embodiment is configured to have the space portion 60 formed with the side face out of the four side faces of the inverter cover 40 lacked, the side face existing on the end portion side in the longitudinal direction of the backlight chassis 14, so that the inverter board 30 can be inserted into and detached from the space portion 60. The lacked side face may be a side face of the four side faces of the inverter cover 40, the side face existing on the center portion side in the longitudinal direction of the backlight chassis 14.

Figure 9:
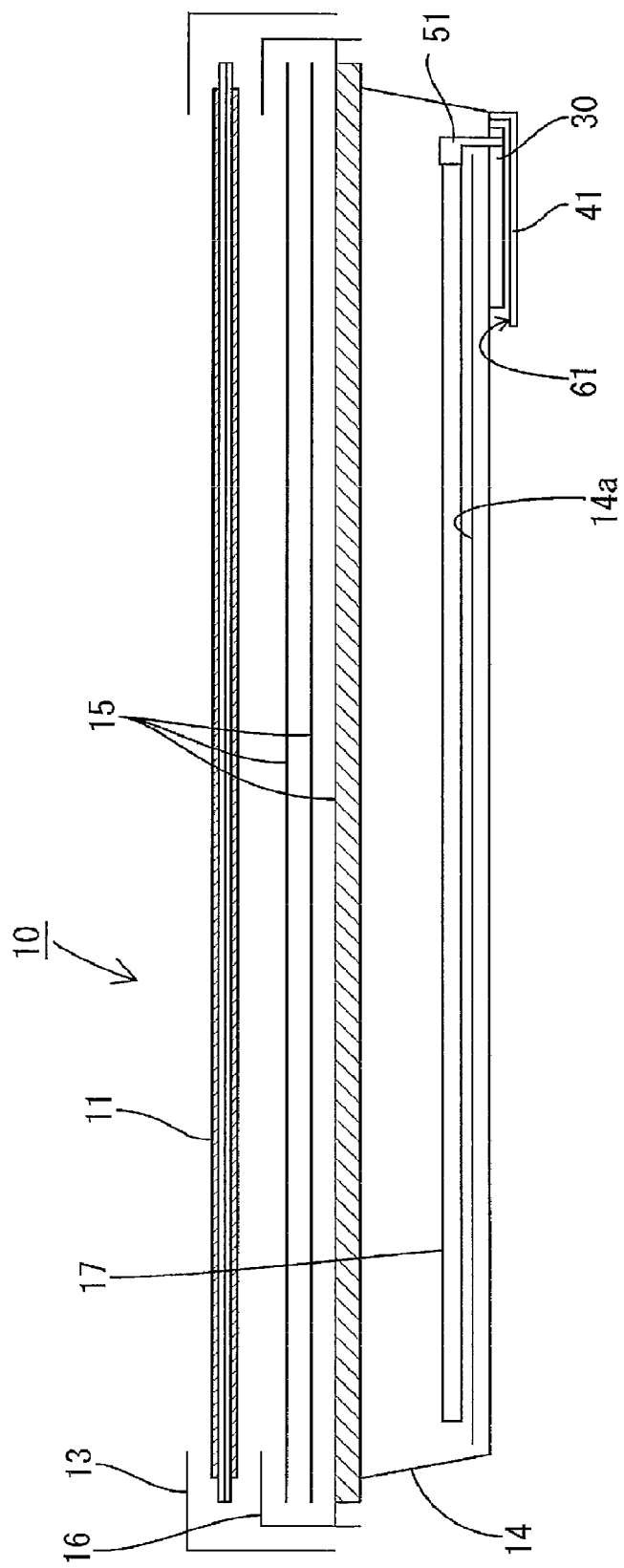
FIG. 9 is a sectional view illustrating a modification of the liquid crystal apparatus.

In this case, as illustrated in FIG. 9, it shall be as follows: terminals 51 connected to the cold cathode tubes 17 penetrate the backlight chassis right thereunder and protrude to the opposite face of the backlight chassis 14; a space portion 61 is formed on the center portion side in the longitudinal direction of the backlight chassis 14; the inverter board 30 is inserted into and detached from the space portion 61 and is connected to the terminals 51.

(2) The above-explained embodiment has the form lacking the side face out of the four side faces of the inverter cover 40, the side face existing on the end portion side in the longitudinal direction of the backlight chassis 14. The side face may have a movable portion on a part thereof so as to be opened and closed. In this case, the inverter board 30 shall be inserted into and detached from the space portion 60 in a state where the side face is opened.

(3) In the above-explained embodiment, the inverter board and the inverter cover 40 are attached on a single side in the longitudinal direction of the backlight chassis 14. The configuration may be that they are attached on both sides in the longitudinal direction of the backlight chassis 14. In this case, drive voltage can be supplied from the inverter board 30 to the both end portions of the cold cathode tubes 17.

(4) In the above-explained embodiment, the inverter cover 40 is illustrated as the laminated substrate. If necessary, a substrate having another function such as a video control board, a lamp control board, or an input/output board. Furthermore, the configuration may be not only that the laminated substrate is attached to the backlight chassis 14 but also that the laminated substrate is attached directly to the inverter board 30.

(5) In the above-explained embodiment, the shapes of the terminals 50 are column-shaped. Not limited to this, the terminals 50 may be polygonal column shaped such as triangle pole or square pole shaped.

(6) While a case where the cold cathode tubes 17 are used as the light source is illustrated in the above-explained embodiment, a light source of another type such as, for example, hot cathode tubes may be used.

(7) In the above-explained embodiment, the TFT is used as the switching elements of the liquid crystal apparatus. It can be adopted to, other than the TFT, any liquid crystal display apparatus using switching elements (e.g. thin-film diodes (TFD)). It can be adopted also to, other than the liquid crystal display apparatus for colored presentation, a liquid crystal display apparatus for black and white presentation.

Furthermore, while the liquid crystal apparatus is illustrated in the above-explained embodiment, the present invention can be adopted to any other display apparatus that uses a backlight device for other than the liquid crystal.

The invention claimed is:

1. A lighting device for use with a display apparatus, the lighting device comprising:
    a light source;
    a flat plate shaped chassis covering the light source; and
    an inverter board attached to the chassis; and
    an inverter cover including a bottom plate and side walls, the bottom plate arranged parallel to a plate surface of the chassis, the side walls being connected to the bottom plate and the chassis so as to form a space defined by the chassis, the bottom plate and the side walls and so as to form an opening at an end of the bottom plate, the space in which the inverter board is arranged and being formed so as to allow the inverter board to slide in a direction parallel to the chassis during attachment and detachment of the inverter board through the opening.

2. The lighting device according to claim 1, further comprising
    a terminal attached to the chassis and connected to the light source, the terminal protruding toward a surface of the chassis opposite from a surface of the chassis on which the light source is disposed and being electrically connected to the inverter board according to insertion of the inverter board to the space.

3. The lighting device according to claim 2, wherein:
    the inverter board includes a receiving portion with an electrode portion therein, the receiving portion in which the terminal is arranged; and;
    the terminal is received by the receiving portion and electrically connected to the electrode portion according to the insertion of the inverter board into the space.

4. The lighting device according to claim 3, wherein
    the receiving portion includes an insertion-detachment allowing portion
    configured with an elastic member and to allow insertion and detachment of the terminal with elastic deformation of the elastic member.

5. The lighting device according to claim 2, wherein:
    the inverter board includes an electrode portion electrically connected to the terminal;
    the terminal includes a terminal-side receiving portion in which the electrode portion is arranged; and
    the electrode portion is received by the terminal-side receiving portion and electrically connected to the terminal according to the insertion of the inverter board to the space.

6. The lighting device according to claim 5, wherein
    the terminal-side receiving portion includes an insertion-detachment allowing portion configured with an elastic member and to allow insertion and detachment of the electrode portion with elastic deformation of the elastic member.

7. A display apparatus comprising:
    the lighting device according to claim 1 and
    a display panel configured to perform display using light from the lighting device.

8. The display apparatus according to claim 7, wherein the display panel is a liquid crystal panel using liquid crystal.

9. The lighting device according to claim 1, wherein the inverter cover further includes a side wall connected between an end of the bottom plate and the chassis.

10. The lighting device according to claim 1, wherein the inverter cover has a box-like shape with a rectangular plan-view shape and an opening at one of four sides.

11. The lighting device according to claim 1, wherein the opening is located at an end of the bottom plate closer to an end of the chassis.

12. The lighting device according to claim 1, wherein the opening is located at an end of the bottom plate closer to a center of the chassis.

13. The lighting device according to claim 2, wherein the chassis further includes a pair of groove portions opening toward each other and in which respective edges of the inverter board are fitted so as to slide therein during the insertion of the inverter board.

14. The lighting device according to claim 2, wherein the terminal and the inverter board are connected to each other such that a side surface of the terminal is in contact with an end of the inverter board away from the opening.

* * * * *